(12) United States Patent
Nakajima et al.

(10) Patent No.: US 8,325,609 B2
(45) Date of Patent: Dec. 4, 2012

(54) DATA PROCESSING DEVICE

(75) Inventors: Masami Nakajima, Kanagawa (JP); Yoshihiro Okuno, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 322 days.

(21) Appl. No.: 12/847,439

(22) Filed: Jul. 30, 2010

(65) Prior Publication Data

US 2011/0026396 A1    Feb. 3, 2011

(30) Foreign Application Priority Data

Jul. 30, 2009   (JP) .................................. 2009-177759

(51) Int. Cl.
*G08C 15/00* (2006.01)
*H04L 12/56* (2006.01)
*H04J 3/04* (2006.01)

(52) U.S. Cl. ........ 370/235; 370/392; 370/401; 370/419; 370/535

(58) Field of Classification Search .......... 370/229–240, 370/389–399, 400–401, 411–420, 535–545
See application file for complete search history.

(56) References Cited

U.S. PATENT DOCUMENTS

| | | | | |
|---|---|---|---|---|
| 5,825,773 | A * | 10/1998 | Shutoh et al. | 370/398 |
| 6,920,145 | B2 * | 7/2005 | Matsuoka et al. | 370/412 |
| 7,085,272 | B2 * | 8/2006 | Sugai et al. | 370/392 |
| 7,088,716 | B2 * | 8/2006 | Sugai et al. | 370/392 |
| 7,243,184 | B1 * | 7/2007 | Ferguson et al. | 711/100 |
| 8,072,974 | B1 * | 12/2011 | Jain et al. | 370/389 |
| 2008/0307198 | A1 | 12/2008 | Kataoka et al. | |

FOREIGN PATENT DOCUMENTS

| | | |
|---|---|---|
| JP | 2001-312479 | 11/2001 |
| JP | 2003-323309 | 11/2003 |
| JP | 2004-326228 | 11/2004 |
| JP | 2005-070938 | 3/2005 |

* cited by examiner

*Primary Examiner* — Tri H Phan
(74) *Attorney, Agent, or Firm* — McDermott Will & Emery LLP

(57) ABSTRACT

This invention provides a data processing device capable of operating a plurality of processing modules in parallel. Processes following a processing flow are assigned to the plural processing modules, respectively, and at least two of the processing modules are capable of running a same process. A network includes an arbitration circuit that, upon receiving a packet from a processing module, according to a process number attached to the packet, selects a processing module out of the processing modules capable of running the process, and outputs the packet to the selected processing module. This thus allows for autonomous transfer of a packet between each processing module and makes it possible to operate the processing modules in parallel.

10 Claims, 15 Drawing Sheets

```
main(){
  Stream_input();
  FFT();
  Interleave();
  .....
  Stream_output();
}
```

| LIBRARY (PROCESS) | PROCESSING MODULE |
|---|---|
| FTT | 1 |
| Interleave-1 | 2 |
| Map | 1 |
| Viterbi | 3 |
| Interleave-2 | 2 |
| Reed Solomon | 3 |
| ... | ... |

FIG. 10

| PROCESSING MODULE | PROCESS |
|---|---|
| PROCESSING MODULE 1 | 1: FTT<br>2: Map |
| PROCESSING MODULE 2 | 1: Interleave-1<br>2: Interleave-2 |
| PROCESSING MODULE 3 | 1: Viterbi<br>2: Reed Solomon |
| ... | ... |

~62

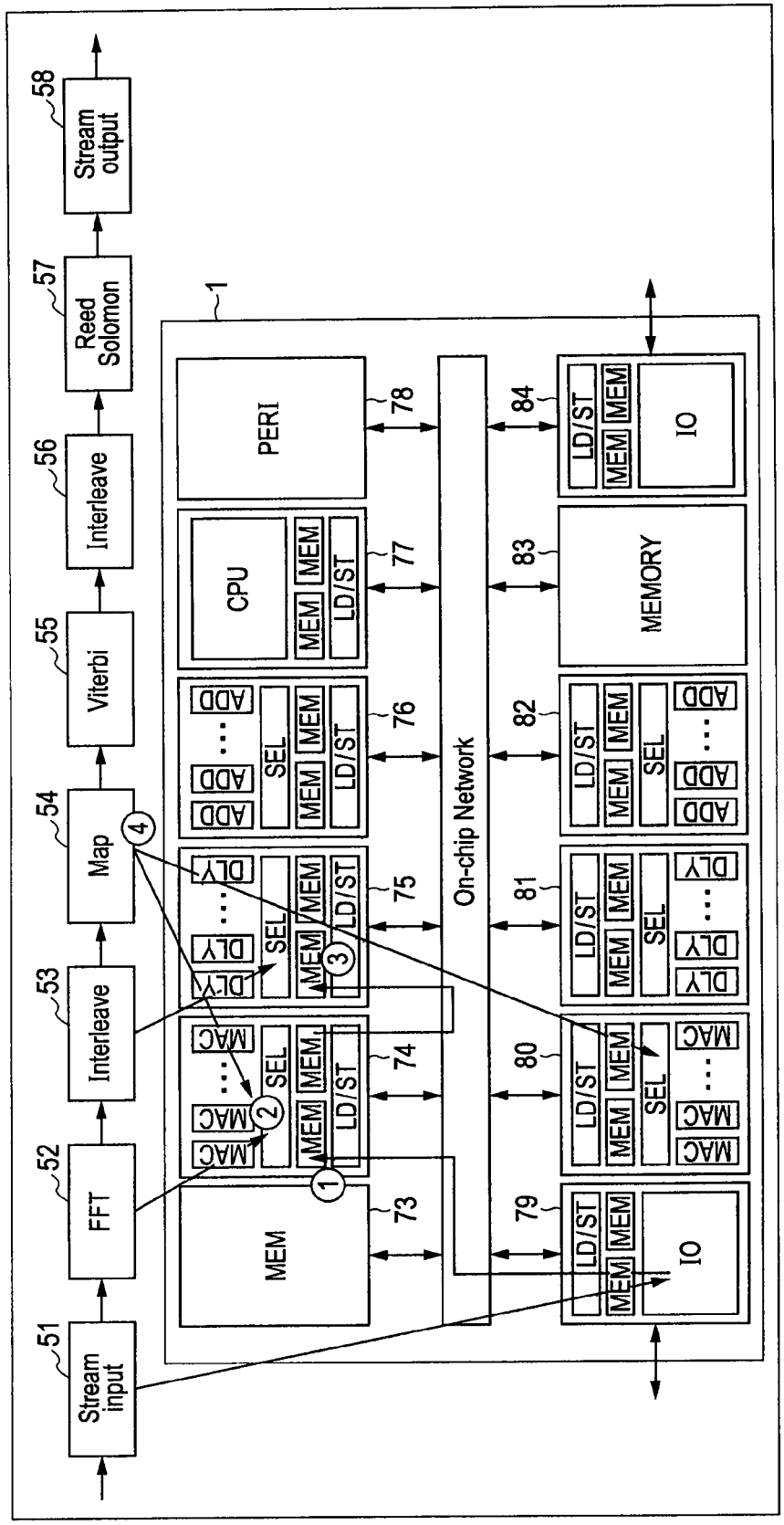

FIG. 17

| PROCESSING MODULE | PROCESS | ENABLED FLAG | |
|---|---|---|---|
| PROCESSING MODULE 1 | 1: FTT | 21-a | ○ (ENABLED) |
| | 2: Map | 21-b | ✕ (DISABLED) |
| PROCESSING MODULE 2 | 1: Interleave-1 | 22-a | ○ (ENABLED) |
| | 2: Interleave-2 | 22-b | ✕ (DISABLED) |
| PROCESSING MODULE 3 | 1: Viterbi | 23-a | ○ (ENABLED) |
| | 2: Reed Solomon | 23-b | ○ (ENABLED) |
| ... | ... | ... | ... |

DATA PROCESSING DEVICE

CROSS-REFERENCE TO RELATED APPLICATIONS

The disclosure of Japanese Patent Application No. 2009-177759 filed on Jul. 30, 2009 including the specification, drawings and abstract is incorporated herein by reference in its entirety.

BACKGROUND OF THE INVENTION

The present invention relates to a technique for carrying out processing using a plurality of hardware processing modules and, in particular, to a data processing device that carries out processing by operating a plurality of hardware processing modules in parallel.

Recently, manufacturers of data processing devices such as wireless communication devices and computers pursue enhancing and diversifying the functions of these devices. Especially, in the fields of communication, image processing, image recognition, etc., such devices are often equipped with media processing engines by which diverse kinds of media processing are implemented. There are wide-ranging requirements for such media processing engines that are implemented with semiconductor technology.

For example, there is an increasing need for a media processing engine that is capable of processing a huge amount of media data in real time. It would be impossible to achieve such a need by relying on only the processing capability of a single CPU (Central Processing Unit), DSP (Digital Signal Processor), etc.

There are also increasing needs for battery drive performance for use in mobile environment and for low power consumption in terms of countermeasures against heat generation.

In addition, with evolution of semiconductor processes, the cost for development of SoC (System on a Chip) rises. This leads to growing demands to decrease the types of semiconductor chips to be developed and to allow a single semiconductor chip to support a plurality of applications. Since customer requirements on marketed products (final products) change rapidly, the cycle of developing a new product (final product) to be marketed needs to be shorter. Consequently, for semiconductor chips, it is also required to shorten the time-to-market.

In the field of communication, particularly, wireless communication including broadcast equipment and mobile phones, and in the field of image processing or the like entailing compression/decompression, diversified standards have been established worldwide and these standards continue to be updated incessantly toward the next generation. To implement multimode processing engines conformable to these standards, semiconductor chips for this purpose are required to have high programmability and high scalability.

Furthermore, developing software is important for semiconductor chips having programmability. In the software development as well, high performance, high quality, and a short delivery period are required and there is a growing demand for the easiness to develop software in order to achieve these requirements.

As techniques relating to the above issues, there are inventions disclosed in the following patent documents 1 to 4. Patent document 1 is intended to solve a problem that latency occurs depending on scheduling in a parallel operational processing device in which processes that can be executed by operation units are fixed. The parallel operational processing device comprises an external input means, a stream input/output means, an external output means, a bus network, an application specific processing circuit, a plurality of operation units, a selector that selects one of first to third clocks, and a control means that adaptively assign, to the plural operation units, processes which comprise external input processing, external output processing, and processing other than the external input processing and the external output processing.

Patent document 2 is intended to provide an image processing apparatus and an image processing method capable of improving the performance of the whole system without adding a receiving buffer or the like, which would result in an increase in the cost. A data packet with a header attached to image data is used. Image processing information is described within the header. When a data packet is input to an image processing LSI, the LSI performs image processing on image data if it is allowed to process the input data packet, and then describes in the header processing complete information indicating that the image processing has finished. If the LSI is not allowed to process the packet, it outputs the packet without describing processing complete information. Thereby, even if an image processing LSI is placed in a state not capable of processing image data, it can transfer a received data packet to the following image processing LSI to hand over the processing to the following LSI. Resources such as image processing LSIs and a bus can be used efficiently.

Patent document 3 is intended to provide a signal processing device and electronic equipment using same, capable of carrying out high-performance and high-efficiency image processing with regard to image processing such as MPEG-4 AVC coding/decoding in which a huge amount of data should be processed. The signal processing device comprises an instruction parallel processor, a first data parallel processor, a second data parallel processor, and application specific hardware that comprises a motion detecting unit, a deblocking filtering unit, and a variable length coding/decoding unit. By this configuration, it is possible to provide a signal processing apparatus and electronic equipment using same, realizing high processing capability and flexibility by distributing load between software and hardware in signal processing of an image compression/decompression algorithm in which a very large amount of data should be processed.

Patent document 4 is intended to provide a multitask processor capable of executing a plurality of tasks in parallel and simultaneously, while suppressing an increase in circuit scale. This multitask processor comprises an instruction memory for storing a program, two instruction processors, each of which reads and decodes an instruction described in a program stored in the instruction memory and executes the instruction as a task, and a scheduler that selects and assigns a task to each of the two instruction processors, based on priority between and among a plurality of tasks.

[Prior Art Documents]
[Patent Documents]
[Patent Document 1]
Japanese Unexamined Patent Publication No. 2004-326228
[Patent Document 2]
Japanese Unexamined Patent Publication No. 2001-312479
[Patent Document 3]
Japanese Unexamined Patent Publication No. 2005-070938
[Patent Document 4]
Japanese Unexamined Patent Publication No. 2003-323309

SUMMARY OF THE INVENTION

In the fields of communication, image processing, image recognition, etc., conventionally, processing engines as application specific hardware are adopted to achieve high performance and low power consumption. However, decreasing the cost for development and shortening the delivery period cannot be achieved with the use of the application specific hardware. Because the application specific hardware is developed to carry out fixed processing, high programmability and high scalability cannot be fulfilled.

In order to realize high programmability and high scalability, some suggestions have been made to implement communication processing, image processing, image recognition processing, etc., using general-purpose programmable devices such as CPU, DSP, and FPGA (Field Programmable Gate Array). However, if general-purpose programmable devices are used to realize performance comparable to that of the processing engines as application specific hardware, such programmable devices would occupy a very large chip area and the power to be consumed by them would become massive. At present, the use of these programmable devices is impracticable in mobile environment.

If a further improvement in the integration degree is foreseen by further development of semiconductor processes in future, the demerit of such programmable devices occupying a considerable chip area can be avoided. Nevertheless, the possibility of decreasing their power consumption would be still low. Instead, with higher power density, a problem with regard to heat generation is anticipated to become more marked.

The present invention has been made to solve the above-noted problems and its object is to provide a data processing device capable of operating a plurality of processing modules in parallel.

According to an exemplary embodiment of the present invention, a data processing device comprising a plurality of processing modules coupled by a network such as a bus is provided. Processes following a processing flow are assigned to these processing modules respectively, and at least two of the processing modules are capable of running a same process. The network includes an arbitration circuit that, upon receiving a packet from a processing module, according to a process number attached to the packet, selects a processing module out of the processing modules capable of running the process and outputs the packet to the selected processing module.

According to this exemplary embodiment, according to a process number attached to the packet, the arbitration circuit selects a processing module out of the processing modules capable of running the process and outputs the packet to the selected processing module. This thus allows for autonomous transfer of a packet between each processing module and makes it possible to operate the processing modules in parallel.

BRIEF DESCRIPTION OF THE DRAWINGS

FIG. 10 illustrates one example of a processing module and process mapping table 62.

FIG. 15 is a diagram to explain a packet flow in the data processing device 1 after the mapping illustrated in FIGS. 14(a) through 14(c).

FIG. 17 illustrates one example of the processing module and process mapping table 63 to which an enabled flag column was added.

DETAILED DESCRIPTION OF THE PREFERRED EMBODIMENTS

In order to solve the above-noted problems, it has been proposed that a data processing device is implemented by a combination of hardware processing modules having the features of high performance and low power consumption and a CPU having the features of high programmability and high scalability.

Figure 1:
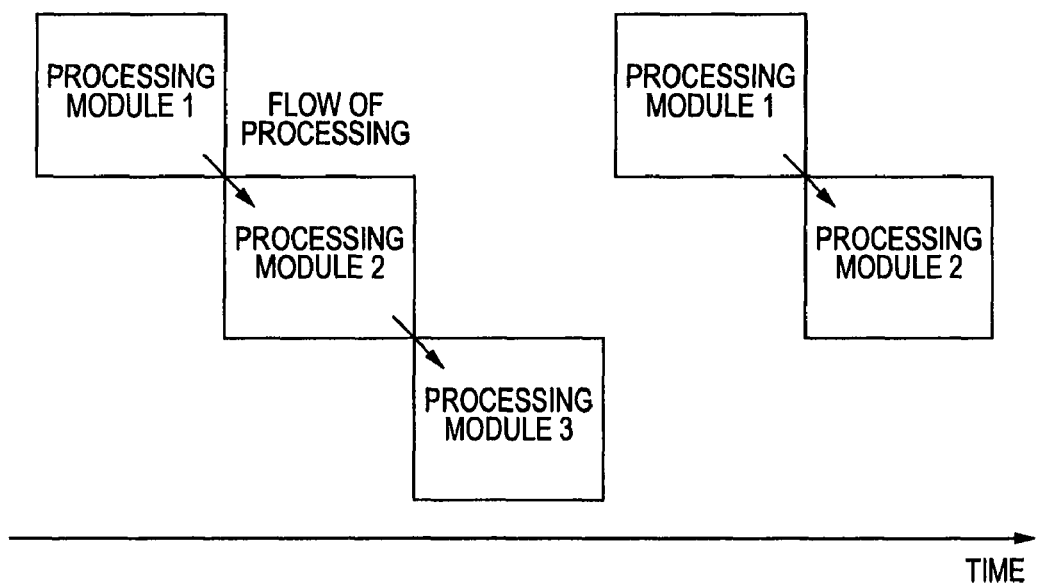
FIG. 1 is a diagram to explain a problem in a data processing device that combines hardware processing modules and a CPU.

FIG. 1 is a diagram to explain a problem in the data processing device that combines the hardware processing modules and the CPU. In FIG. 1, when the CPU is executing a program, the hardware processing modules (hereinafter simply referred to as processing modules) 1 to 3 are called serially and processing is carried out serially by each of the processing modules 1 to 3. That is, after the processing by the processing modules 1 is completed, the processing module 2 starts its processing. Then, after the processing by the processing module 2 is completed, the processing module 3 starts its processing.

In this manner in which the CPU calls the processing modules serially when it is executing a program, one processing module is only allowed to carry out processing at a time. Therefore, the processing performance decreases.

Figure 2:
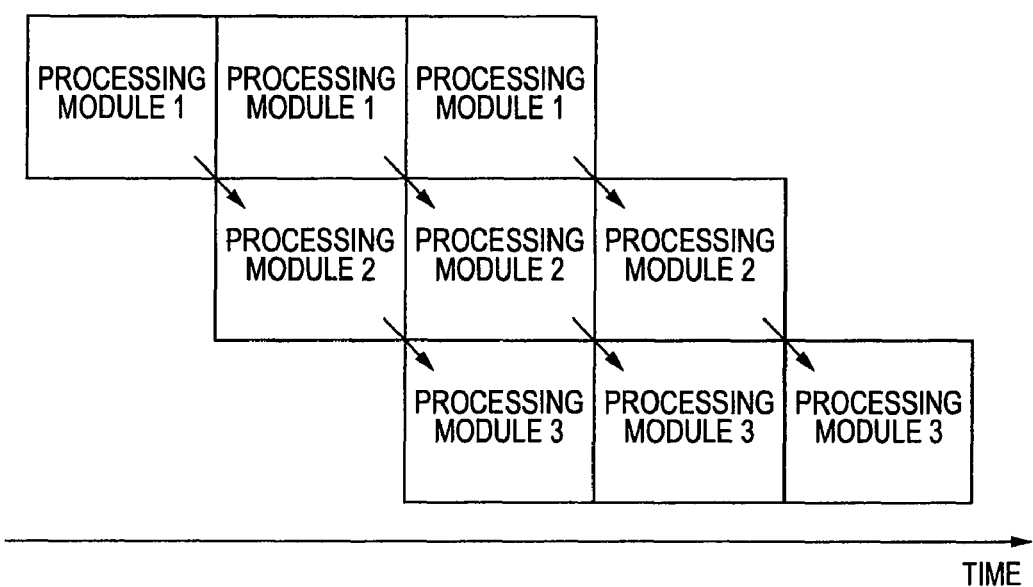
FIG. 2 is a diagram illustrative of a case where processing modules 1 to 3 are allowed to carry out processing in parallel by pipelining.

FIG. 2 is a diagram illustrative of a case where the processing modules 1 to 3 are allowed to carry out processing in parallel by pipelining. Because the processing modules 1 to 3 carry out their processing in parallel, the processing performance is improved in comparison to the case where each processing module carries out processing serially, as shown in FIG. 1.

First Embodiment

Figure 3:
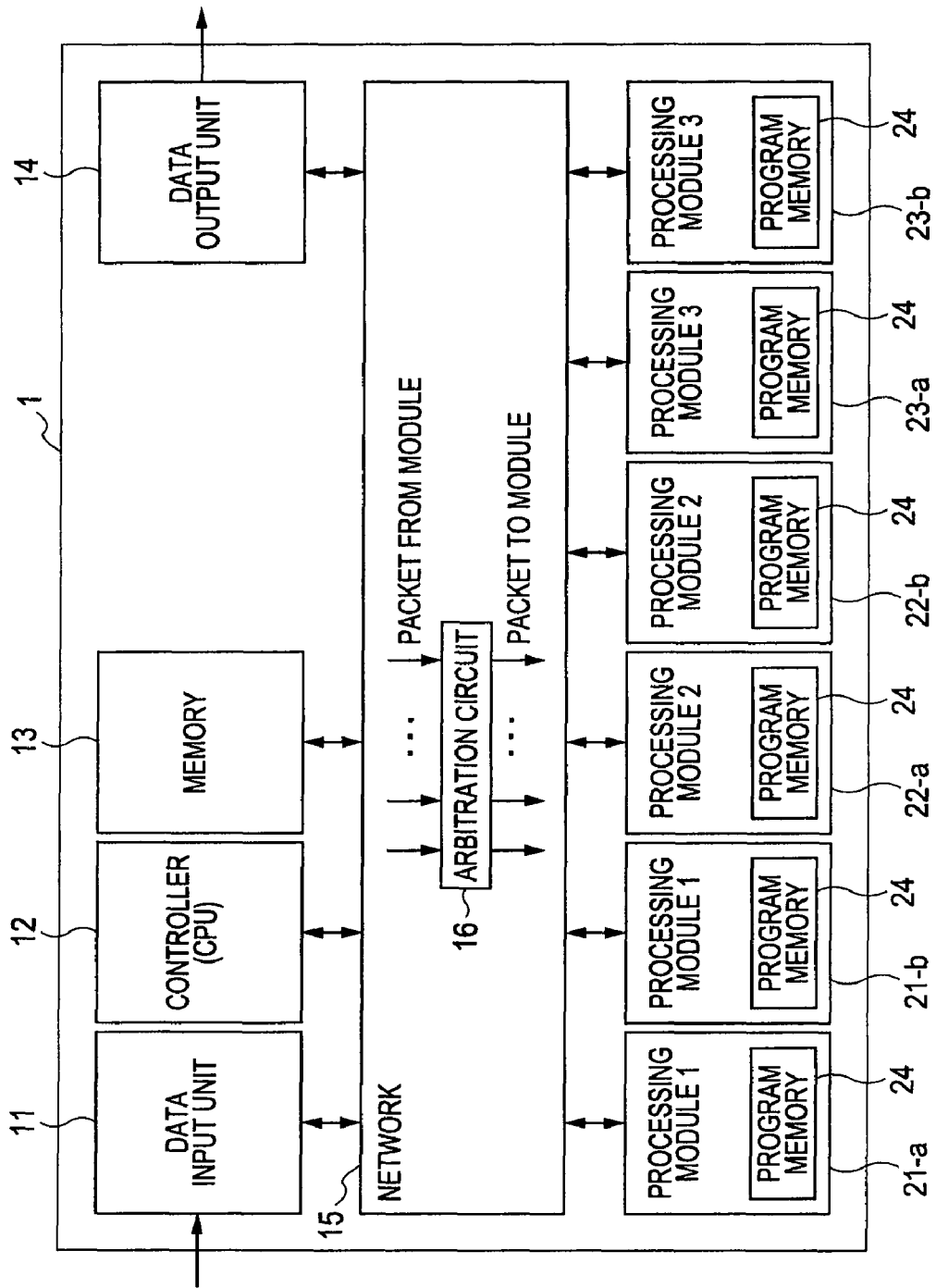
FIG. 3 is a block diagram showing an outlined structure of a data processing device in a first embodiment of the present invention.

FIG. 3 is a block diagram showing an outlined structure of a data processing device in a first embodiment of the present invention. The data processing device 1 includes a data input unit 11, a controller (CPU) 12, a memory 13, a data output unit 14, processing modules 1 (21-a, 21-b), processing modules 2 (22-a, 22-b), and processing modules 3 (23-a, 23-b) and these components are coupled via a network 15. This network 15 is a packet transport network such as, e.g., a split transaction bus.

The data input unit 11 is a module for taking input of data from outside. It creates a packet by assembling input data into a unit of processing and outputs the packet to the network 15. Details about the packet will be described later.

The controller 12 is a module that performs overall control of the data processing device 1. When initializing the data processing device, it loads programs and parameters into respective program memories 24 of the processing modules. Upon the completion of loading of the programs and parameters by the controller 12, all the processing modules enter a wait state for data input.

The memory 13 may comprise a nonvolatile memory such as flash memory or MRAM (Magnetoresistive Random Access Memory) or a volatile memory such as SRAM (Static Random Access Memory). The memory 13 stores information such as programs and parameters that are to be loaded into the processing modules.

The data output unit 14 is a module for outputting data to outside. When it receives a packet from the network 15, it converts the data contained in the packet into data in accordance with a protocol for an external IF (Interface) and outputs the latter data.

The processing module 1 (21-a) and the processing module 1 (21-b) have equivalent functions and are capable of selectively running a same process. The same is true for the processing module 2 (22-a) and the processing module 2 (22-b). The same is also true for the processing module 3 (23-a) and the processing module 3 (23-b).

An arbitration circuit 16 is incorporated in the network 15; this circuit performs an arbitration between or among packets received from the modules and outputs a packet to a processing module to carry out next processing. Details about the arbitration circuit 16 will be described later.

Figure 4:
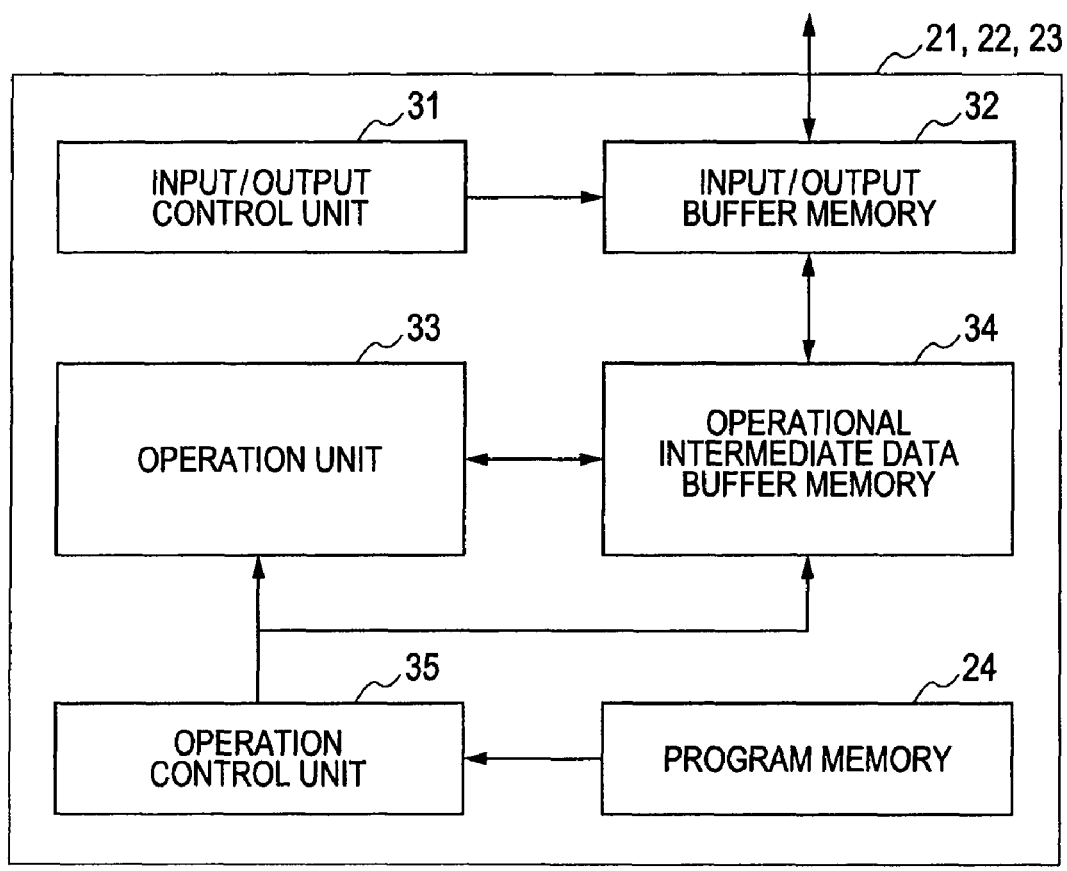
FIG. 4 is a diagram illustrating a configuration example of a processing module.

FIG. 4 is a diagram illustrating a configuration example of a processing module. This processing module includes a program memory 24, an input/output control unit 31, an input/output buffer memory 32, an operation unit 33, an operational intermediate data buffer memory 34, and an operation control unit 35.

The operation unit 33 may comprise a computing unit such as FPU (Floating Point Unit) or DSP (Digital Signal Processor) whose computing operation can be controlled by a program. Alternatively, the operation unit 33 may comprise a circuit such as FPGA (Field Programmable Gate Array) whose logic and coupling configuration is reconfigurable. In a case where the operation unit 33 comprises a circuit whose logic and coupling configuration is reconfigurable, the operation control unit 35 reads information for setting up the logic and coupling configuration of the operation unit 33 from the memory 13 or the like and performs the setup of the logic and coupling configuration of the operation unit 33 before the operation unit 35 begins operational processing.

The input/output control unit 31 controls input and output of a packet from/to the network 15. When the input/output control unit 31 stores data resulting from an operation into a packet and outputs the packet to the network 15, it updates information such as a processing stage number and a process number of the packet, which will be described later.

The input/output buffer memory 32 temporarily stores packets received from the network 15 and packets to be output to the network 15.

The operation control unit 35 sequentially decodes instruction codes stored in the program memory 24 and controls the operational processing of the operation unit 33 according to a result of decoding. According to a result of decoding, the operation control unit 35 also allocates a parameter stored in the program memory 24 to the operational intermediate data buffer memory 34.

The operational intermediate data buffer memory 34 temporarily stores data to be used by the operation unit 33 for computing operation and data (intermediate data) in the middle of operation by the operation unit 33. The operation unit 33 executes operational processing, while referring to the contents of the operational intermediate data buffer memory 34.

Figure 5:
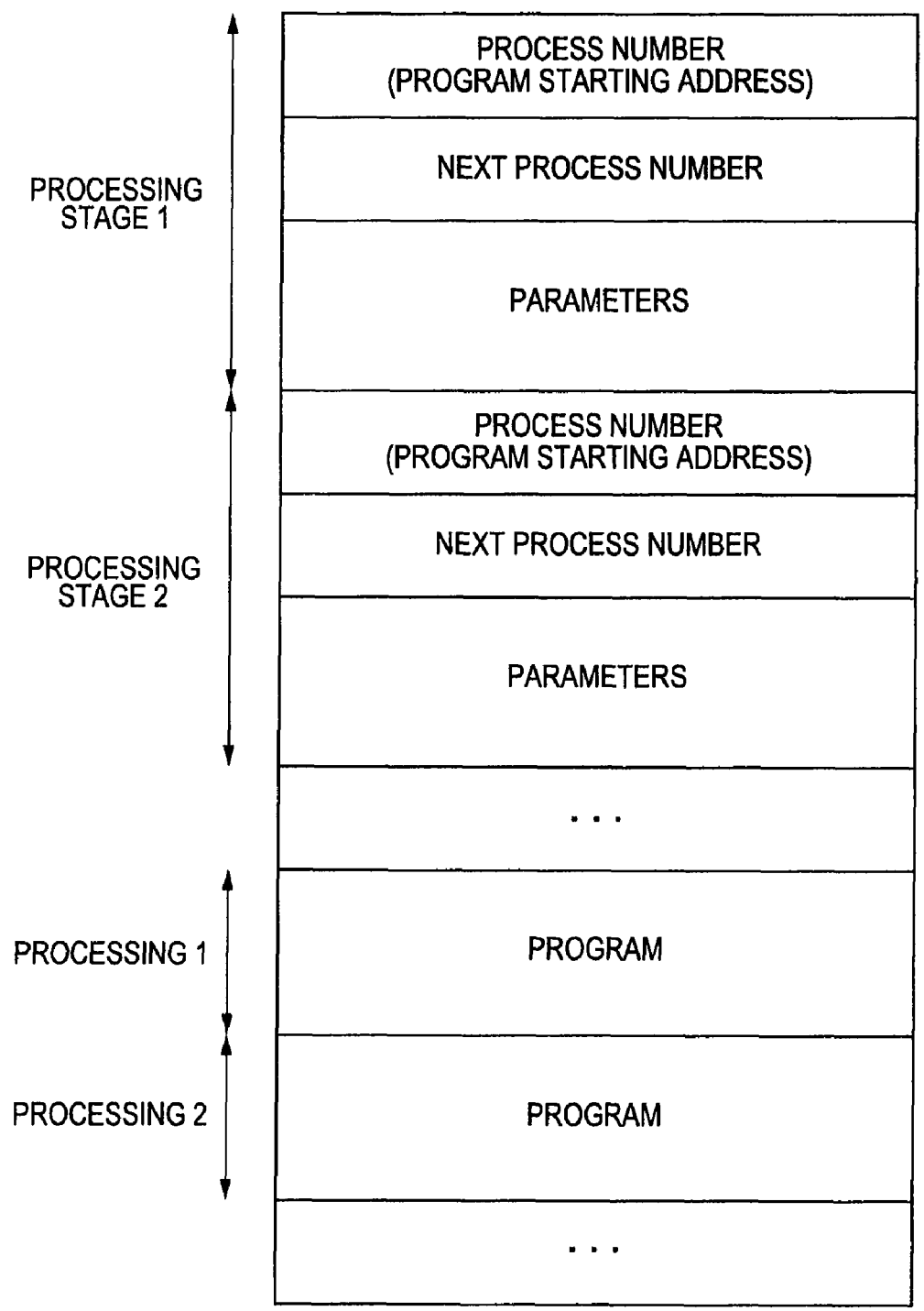
FIG. 5 is a diagram illustrative of information such as programs and parameters stored in a program memory 24 within each processing module.

FIG. 5 is a diagram illustrative of information such as programs and parameters stored in the program memory 24 within each processing module. The program memory 24 stores programs corresponding to a plurality of processes and moreover stores information indicating which processing stage number relates to which process number.

In an area for each processing stage, a process number (program starting address) related to that processing stage, a next process number, and parameters are stored. A processing module refers to the process number (program starting address) related to the processing stage number and starts to execute the corresponding process. At this time, the parameters stored for the processing stage are used.

Then, upon completing the execution of the process, the processing module determines a process to which the resulting data should be passed by referring to the next process number.

Figures 6, 7:
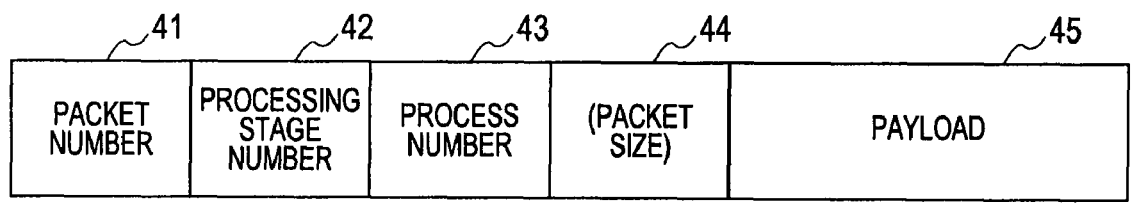
FIG. 6 is a diagram illustrating an example of packet structure.
FIG. 7 is a diagram illustrating one example of an application program.

FIG. 6 is a diagram illustrating an example of packet structure. A packet includes a packet number 41, a processing stage number 42, a process number 43, a packet size 44, and payload 45.

The packet number 41 is attached to each packet by the data input unit 11; the packet number is a serially incremental value such as, e.g., "0" for a first packet, "1" for a second packet, and so on. The arbitration circuit 16 gives priority to data in a packet with a smaller packet number 41.

The processing stage number 42 indicates what number processing stage to which the packet data is related.

The process number 43 implies a set of selectable processing modules. Which processing module is to run the process is determined by the arbitration circuit 16. For example, if a same process is executed twice, like FFT (Fast Fourier Transform), because of the same process number, a next process to be executed cannot be determined only from the process number 43. However, the first execution of the process and the second execution of the process are assigned different processing stage numbers, the next process to be executed can be determined by using both processing stage number 42 and process number 43 information.

The packet size 44 is information that becomes necessary if packets of different sizes are handled in an application. If all packets used in an application have an equal size, this packet size is not needed.

When the arbitration circuit 16 receives packets from the modules, it performs a bus arbitration, giving priority to a packet having a smaller packet number 41. Since the number of bits allowed to be used to assign a packet number 41 is predetermined and packet numbers are finite, a situation may be envisaged where a new input packet number exceeds an upper limit of packet numbers. In that case, the new packet number is initialized to "0" and a bus arbitration is performed in a wraparound manner.

More specifically, the arbitration circuit 16 compares upper two bits of packet numbers 41. If the upper two bits of the packet numbers of two packets are "00" and "01", the arbitration circuit gives priority to a packet having the "00" upper bits of packet number. If the upper two bits of the packet numbers of two packets are "01" and "10", the arbitration circuit gives priority to a packet having the "01" upper bits of packet number. If the upper two bits of the packet numbers of two packets are "10" and "11", the arbitration circuit gives priority to a packet having the "10" upper bits of packet number. If the upper two bits of the packet numbers of two packets are "11" and "00", the arbitration circuit gives priority to a packet having the "11" upper bits of packet number.

If the upper two bits of packet numbers 41 are identical, the arbitration circuit 16 compares bits other than the upper two bits and gives priority to a packet having a smaller packet number.

The arbitration circuit 16 can perform a bus arbitration in either a dynamic or static arbitration manner. Dynamic arbitration is a manner in which, upon receiving packets, the arbitration circuit 16 determines a processing module to execute a process related to each processing stage. Processes can be distributed evenly to the processing modules without predicting the size and frequency of data for processing.

For instance, the arbitration circuit 16 selects a packet through an arbitration between or among packets and registers a processing module that has output the packet as the processing module that is running the relevant process. Then, upon receiving a packet containing resulting data from the process from the processing module, the arbitration circuit registers the processing module as the one placed in a standby state for processing. Thereby, a distinction can be made between a processing module in a standby state and a processing module in a running state and load can be distributed.

In contrast, static arbitration is a manner in which processing modules to run a process related to each processing stage are predetermined before execution of an application. This is advantageous in a case where the size and frequency of data for processing can be predicted in advance. The hardware scale of the arbitration circuit 16 can be reduced.

FIG. 7 is a diagram illustrating one example of an application program. As illustrated in FIG. 7, the application program is described as a set of a plurality of processes constituting the application. The processes are provided as libraries described in a commonly used description language such as C language and a processing flow of the application is described using the libraries.

In FIG. 7, "Stream_input( );" is described as a data input process, "FFT( )" is described as an FFT process, "Interleave( )" is described as an interleaving process, and "Stream_output( )" is described as an data output processing. A result of execution of the described application can be verified by simulation using the libraries for simulation.

Figures 8, 9:
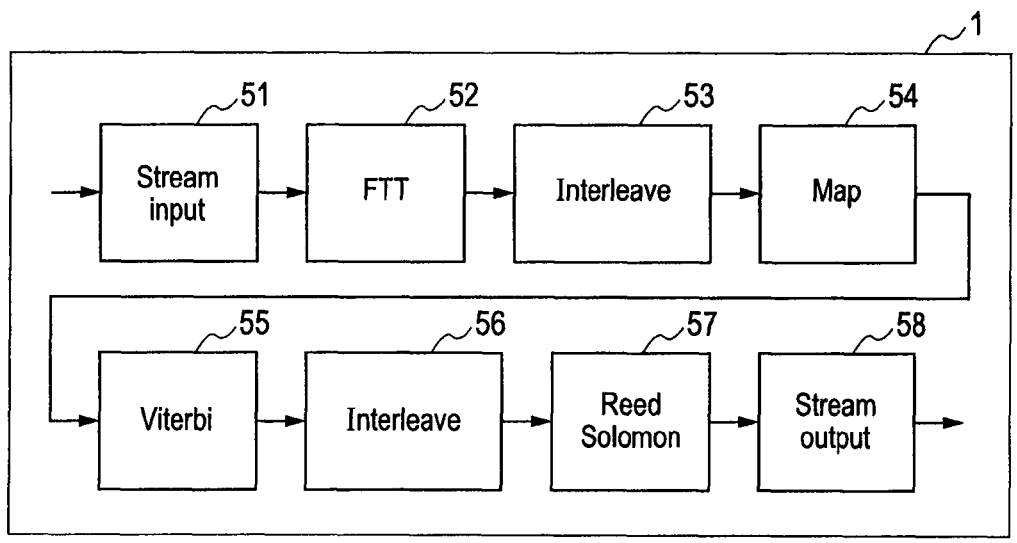
FIG. 8 is a diagram illustrating one example of a processing flow described using a graphical user interface.
FIG. 9 illustrates one example of a library and processing module mapping table 61.

FIG. 8 is a diagram illustrating one example of a processing flow described using a graphical user interface. A graphical user interface such as, e.g., MATLAB is used to describe a processing flow. As in the program illustrated in FIG. 7, this description includes libraries 51 to 58 and the processing flow is described in order in which the libraries are to be processed.

The descriptions in the program illustrated in FIG. 7 and the processing flow illustrated in FIG. 8 correspond to the processes and each process is mapped to a processing module capable of running that process. FIG. 9 illustrates one example of a library and processing module mapping table 61.

In FIG. 9, the table contents indicate that a processing module capable of running, for example, "FFT" is "1", a processing module capable of running "Interleave-1" is "2", and a processing module capable of running "Map" is "1". Similar mapping to a processing module is done for "Viterbi", "Interleave-2", and "Reed Solomon". A plurality of processing modules that can run a process are registered.

FIG. 10 illustrates one example of a processing module and process mapping table 62. A list of mapping between all processes that constitute the application and processing modules is created and stored on the arbitration circuit 16. At this time, based on the processing flow illustrated in FIG. 7 or FIG. 8, each process is related to a processing stage number and a next process number, as illustrated in FIG. 5, and such relations for all processes are stored in the memory 13.

Figure 11:
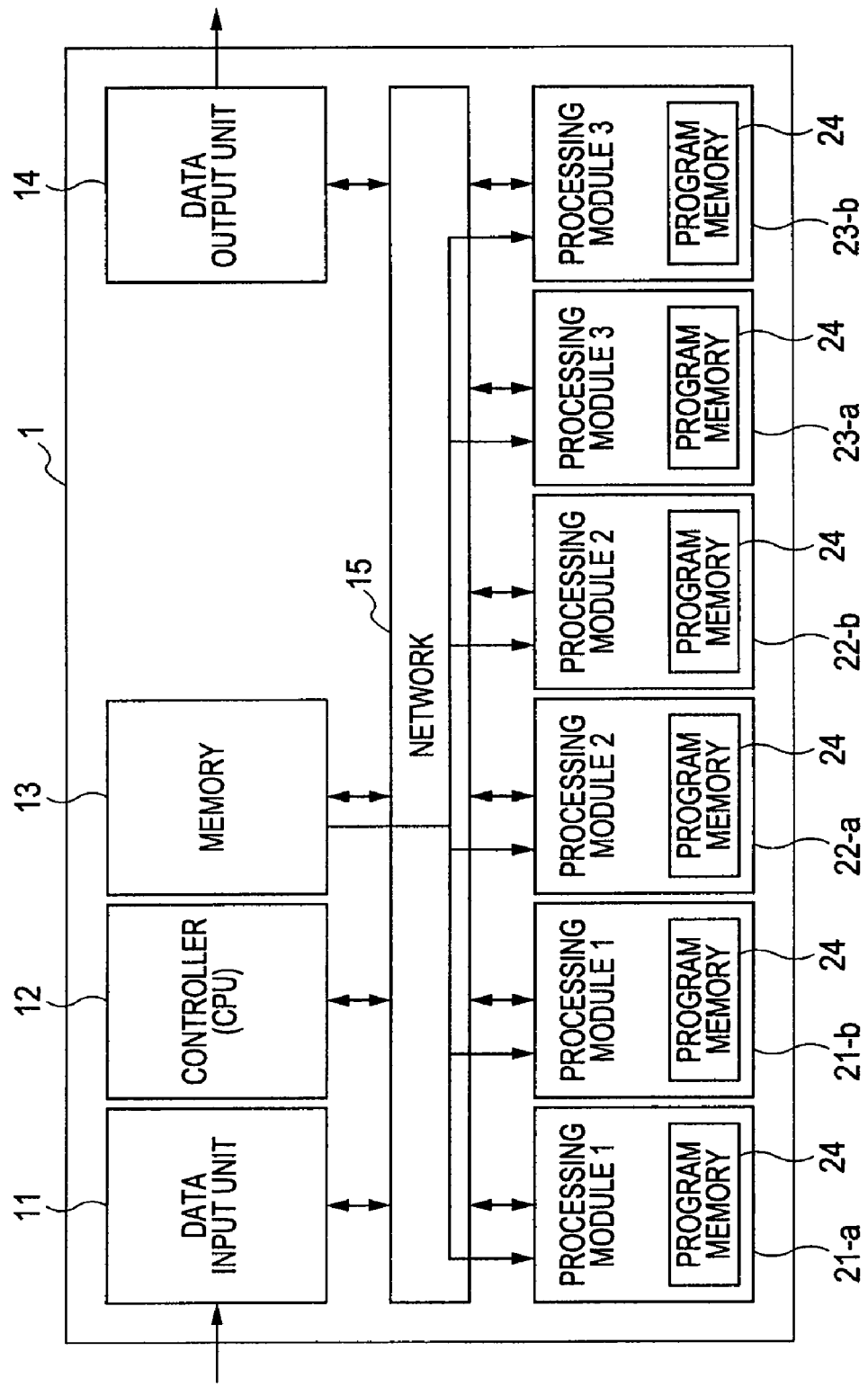
FIG. 11 is a diagram to explain preparation for hardware run of the data processing device in the first embodiment of the present invention.

FIG. 11 is a diagram to explain preparation for hardware run of the data processing device in the first embodiment of the present invention. When the data processing device 1 is reset, the system enters an initial state. During an initializing operation of the system, the controller (CPU) 12 loads programs and parameters as illustrated in FIG. 5 into the program memories 24 of the processing modules (21-*a* to 23-*a*, 21-*b* to 23-*b*).

Upon completion of this operation, the system enters a Ready state where the data input unit 11 is ready for taking input of data and all the processing modules are ready for running a process. At this time, the data input unit 11 enters a wait state for input data.

When the data input unit 11 takes input of data from outside, it creates a packet by assembling data into a unit of processing, attaches a serial number as the packet number 41 to the packet, and adds "1" in the processing stage number 42 field of the packet. Then, it adds a process number 43 corresponding to a first process to be executed for processing the data. The data input unit 11 outputs the created packet to the network 15.

The arbitration circuit 16 within the network 15 performs a bus arbitration and outputs a packet to a processing module. Upon receiving the packet, the processing module branches to a program address corresponding to the process number 43 and executes the process. At this time, the processing module carries out processing, based on a parameter such as the number of points for FFT.

When the processing module completes the process, it increments the processing stage number 42 in the packet and updates the process number 43 according to the next process number. Then, the processing module outputs the packet to the network 15.

Upon completion of processing by the relevant processing modules for the packet, when the data output unit 14 receives the packet, it converts the data contained in the packet into data in accordance with a protocol for an external IF and outputs the latter data.

Figure 12:
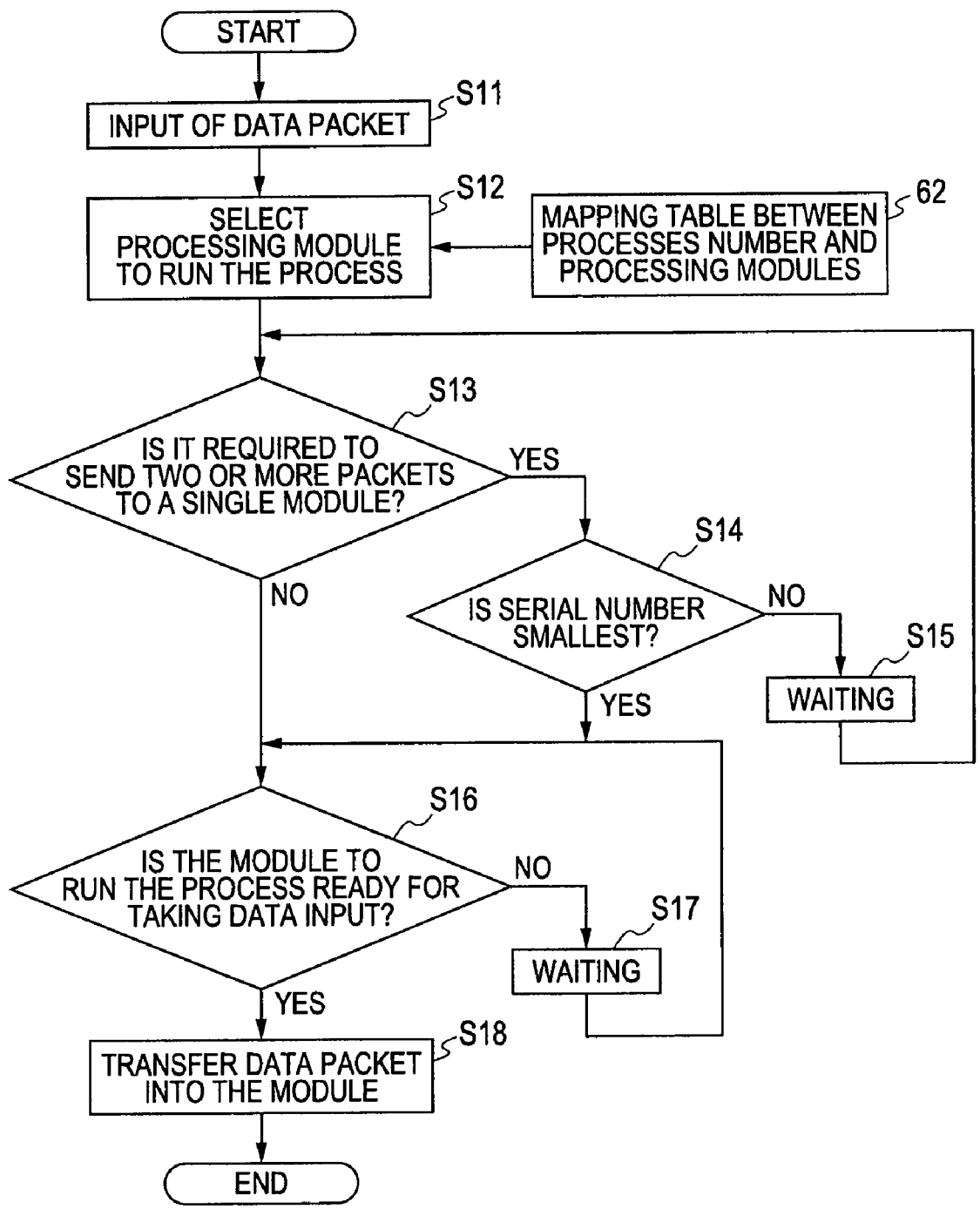
FIG. 12 a flowchart illustrative of a bus arbitration procedure which is performed by an arbitration circuit 16.

FIG. 12 a flowchart illustrative of a bus arbitration procedure which is performed by the arbitration circuit 16. First, when a data packet is input to the arbitration circuit 16 (S11), the arbitration circuit 16 selects a processing module to run the process, referring to the mapping table between process numbers and processing modules table (the processing module and process mapping table 62) illustrated in FIG. 10 (S12). This selection is made based on the process number 43 in the packet and a processing module is selected by dynamic arbitration or static arbitration as described above.

Then, the arbitration circuit 16 determines whether it is required to send two or more packets to a single processing module (S13). If it is not required to send two or more packets to a single processing module (No, S13), the procedure goes to step S16.

If it is required to send two or more packets to a single processing module (Yes, S13), the arbitration circuit 16 determines whether the serial number (packet number 41) of the packet is smallest (S14). If the serial number of the packet is smallest (Yes, S14), the procedure goes to step S16. If not so (No, S14), the arbitration circuit 16 keeps the packet waiting without outputting it (S15).

There is a possibility that the arbitration circuit receives at the same time two or more packets required to be transferred into a single processing module. In that case, it performs an arbitration, giving priority to a packet with a smaller serial number. This is because, unless observing the principle that a packet with a smaller serial number is processed earlier, processing continues to loop in processing modules to which the packets have been transferred, which is likely to result in stop of processing of the whole system.

At step S16, the arbitration circuit 16 determines whether the processing module to run the process is ready for taking data input. If the processing module to run the process is not ready for taking data input (No, S16), the arbitration circuit 16 keeps the packet waiting without outputting it (S17).

If the processing module to run the process is ready for taking data input (Yes, S16), the arbitration circuit 16 outputs the data packet to the processing module to run the process (S18) and terminates the procedure.

Figure 13:
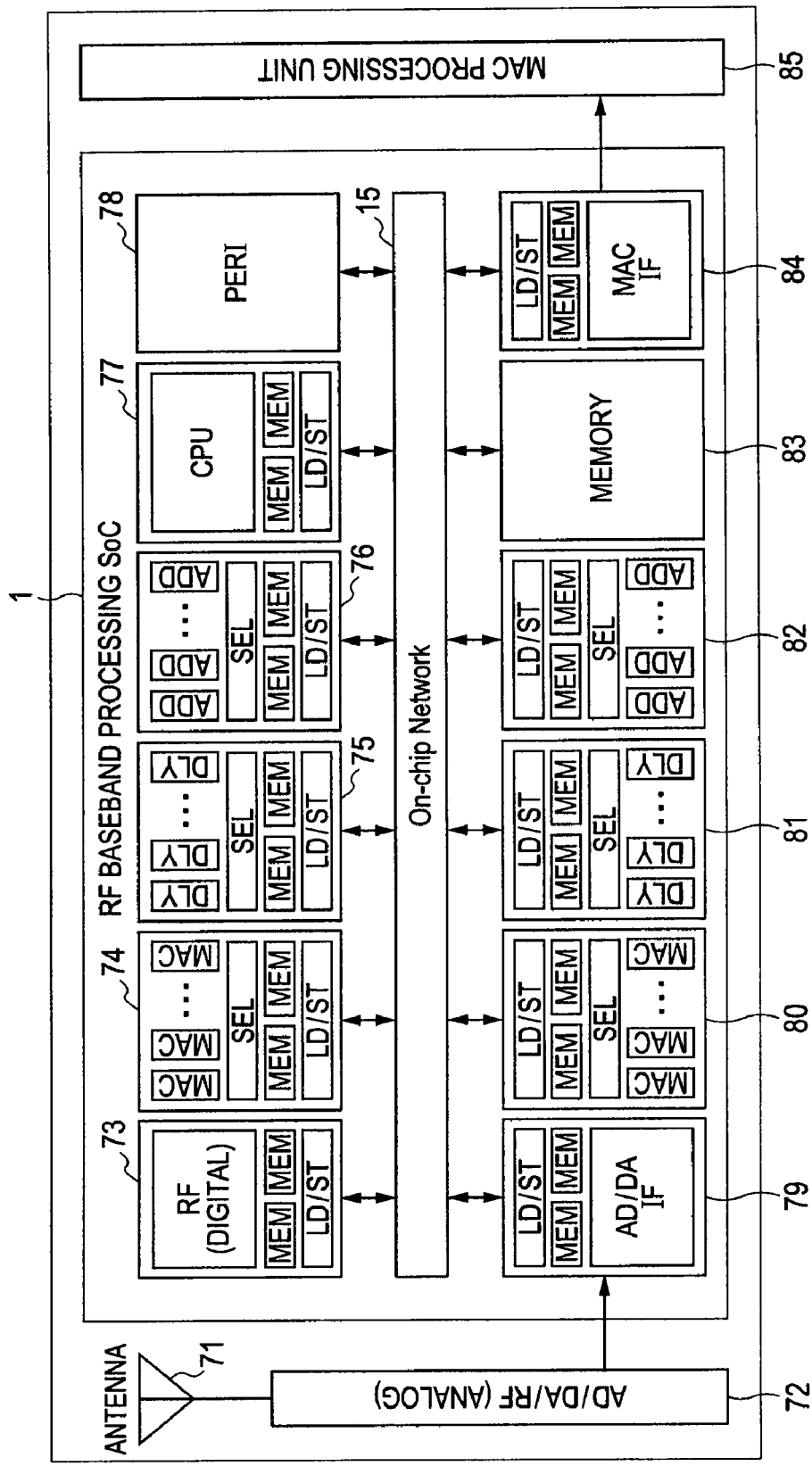
FIG. 13 is a diagram illustrating an example of application of the data processing device in the first embodiment of the present invention to a multimode enabled wireless communication baseband circuit.

FIG. 13 is a diagram illustrating an example of application of the data processing device in the first embodiment of the present invention to a multimode enabled wireless communication baseband circuit. This baseband circuit includes an RF/baseband processing SoC (data processing device) 1, an antenna 71, an AD/DA RF circuit 72, and a MAC processing unit 85. The RF/baseband processing SoC 1 includes modules 73 to 84 and a network 15 for coupling these modules. Blocks in each module schematically represent functions and the like that are realized by programs.

A module 79 corresponds to the data input unit 11 shown in FIG. 3, includes an AD/DA IF which is an interface with the AD/DA RF circuit 72, memories (MEMs), and an LD/ST component, and carries out the processing of the above-mentioned data input unit 11. The module 79 creates a packet using a memory (MEM) and outputs the created packet through the LD/ST component to the network 15. The LD/ST component corresponds to the input/output control unit 31 shown in FIG. 4.

Processing modules 74 and 80 have equivalent functions and are capable of running a same process. These processing modules 74 and 80 are those that carry out processing mainly by MAC (Multiply Accumulate) operations by executing programs stored in their program memories 24.

Processing modules 75 and 81 have equivalent functions and are capable of running a same process. These processing modules 75 and 81 are those that carry out processing mainly by delay operations by executing programs stored in their program memories 24.

Processing modules 76 and 82 have equivalent functions and are capable of running a same process. These processing modules 76 and 82 are those that carry out processing mainly by add operations by executing programs stored in their program memories 24.

A module 84 corresponds to the data output unit 14 shown in FIG. 3, includes a MAC IF which is an interface with the MAC processing unit 85, memories (MEMs), and an LD/ST component, and carries out the processing of the above-mentioned data output unit 14.

Modules 77 and 83 correspond to the controller 12 and the memory 13, respectively, shown in FIG. 3. Modules 73 and 78 are those having functions requisite for the RF (Radio Frequency) section and for peripheral equipment, respectively.

Figure 14A:
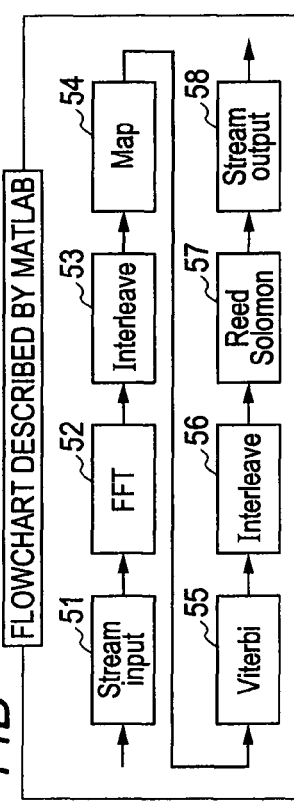
FIGS. 14(a) through 14(c) illustrate how the processing flow of software is mapped onto the data processing device 1.
Figure 14B:
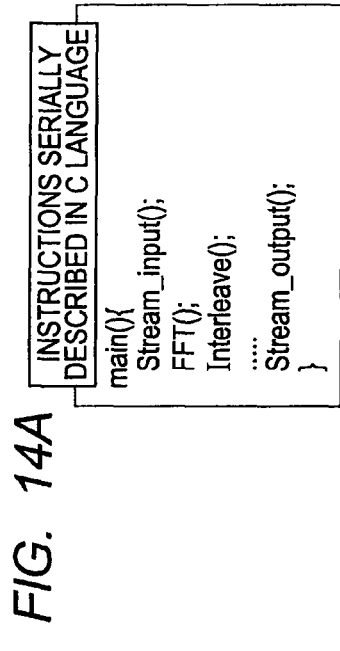
Figure 14C:
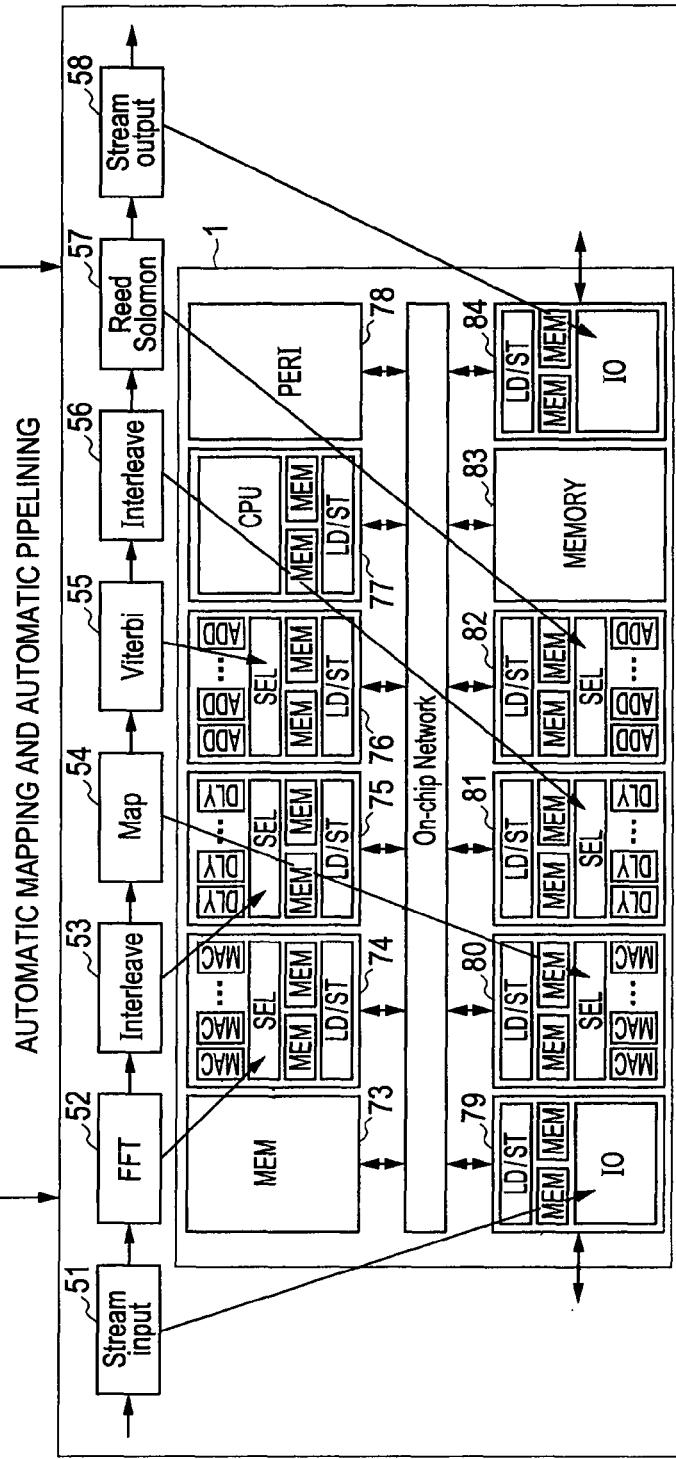

FIGS. 14(a) through 14(c) illustrate how the processing flow of software is mapped onto the data processing device 1. FIG. 14(a) illustrates a program described in C language, which is the same as illustrated in FIG. 7. FIG. 14(b) illustrates a flowchart described by MATLAB, which is the same as illustrated in FIG. 8.

FIG. 14 (C) illustrates mapping of the processes described in FIG. 14(a) or FIG. 14(b) onto the processing modules. The described processes 51 to 58 are mapped onto the processing modules 79, 74, 75, 80, 76, 81, 82, and 84, respectively.

FIG. 15 is a diagram to explain a packet flow in the data processing device 1 after the mapping illustrated in FIGS. 14(a) through 14(c). When a packet is crated by the processing module 79 to which Stream input 51 was mapped, the packet is output to the processing module 74 to which FFT was mapped and FFT processing on the packet data is carried out by the processing module 74.

Upon completion of the processing by the processing module 74, resulting data from the processing is stored in the packet which is in turn output to the processing module 75 to which Interleave 53 was mapped. Interleaving on the packet data is performed by the processing module 75.

Upon completion of the processing by the processing module 75, resulting data from the processing is stored in the packet which is in turn output to a processing module to which Map 54 was mapped. At this time, since there are two processing modules capable of running the Map process, the arbitration circuit 16 determines which of the processing modules 74 and 80 should be assigned to run the process, depending on the load status of each processing module. In FIG. 15, the arbitration circuit 16 selects the processing module 80 operating under a lighter load and causes this module 80 to run the process.

As described hereinbefore, according to the data processing device in the present embodiment, serial numbers are assigned to packets containing data to be processed in a flow and a mechanism is provided to allow for autonomous transfer of a packet between each processing module. Accordingly, a plurality of processing modules are allowed to operate in parallel and so-called pipeline processing can be realized.

The functions of the processing modules can be reconfigured by changing a program to be stored in the program memory of each processing module. Thus, high programmability and high scalability become feasible. Furthermore, it is thereby possible to provide a data processing device that can fulfill the requirements of high performance, low power consumption, low cost for development, and a short delivery period.

Processing flow can be described using libraries described in a commonly used description language such as C language. This thus facilitates the development of software.

Second Embodiment

A data processing device in a second embodiment of the present invention is characterized in that a plurality of memory banks are provided within each processing module.

As in the baseband circuit shown in FIG. 13, each of the processing modules 73 to 84 has two memories (MEMs). One memory is used to store internal data in the processing module and the other memory is used to buffer data that is input from and output to an external processing module. Thereby, operational processing and data input/output processing can be performed in parallel by the processing module.

As described above, according to the data processing device in the present embodiment, a plurality of memory banks are provided in each processing module. This allows the processing module to perform operational processing and input/output processing in parallel. It is thereby possible to further improve the processing efficiency of the data processing device.

Third Embodiment

Figure 16:
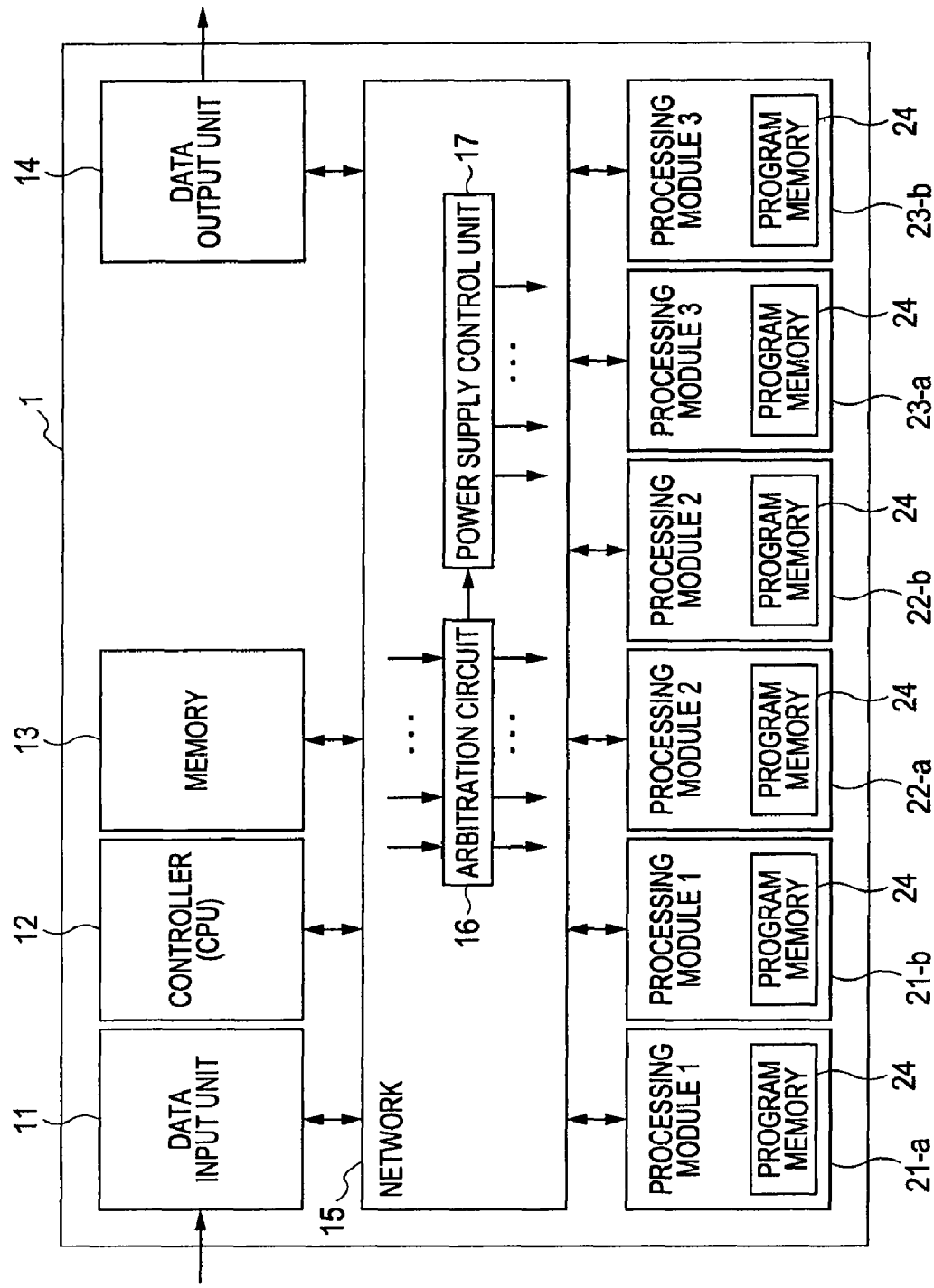
FIG. 16 is a block diagram showing an outlined structure of a data processing device in a third embodiment of the present invention.

FIG. 16 is a block diagram showing an outlined structure of a data processing device in a third embodiment of the present invention. In comparison to the data processing device in the first embodiment shown in FIG. 3, a difference only lies in that a power supply control unit 17 is provided within the network. Therefore, detailed description of duplicative components and functions is not repeated.

The power supply control unit 17 performs on/off control of the power supply of each processing module, based on control information which is output from the arbitration circuit 16. That is, when the arbitration circuit 16 selects a packet through an arbitration between or among packets, it causes the power supply control unit 17 to turn on the power supply of a processing module to which the packet should be output and then sends the packet to the processing module. Once having received a packet from the processing module, the arbitration circuit causes the power supply control unit 17 to turn off the power supply of the processing module, as it judges that the processing by the processing module has finished. With regard to this power supply control, autonomous power supply control is performed without intervention of the CPU 12. Memory elements are made of nonvolatile devices so that they can hold data even in a power-off state.

As described above, according to the data processing device in the present embodiment, the power supply of a processing module is turned off unless the module is running a process. This can contribute to decreasing power consumption.

Because nonvolatile devices are used as memory elements, a processing module can resume processing as soon as its power supply is turned on.

Fourth Embodiment

A data processing device in a fourth embodiment of the present invention is characterized in that malfunction diagnosis of the processing modules is periodically performed and the arbitration circuit outputs a packet to a processing module after determining whether each processing module is able to carry out processing. In comparison to the data processing device in the first embodiment shown in FIG. 3, a difference only lines in that an enabled flag column is added to the processing module and process mapping table maintained in the arbitration circuit. Therefore, detailed description of duplicative components and functions is not repeated.

FIG. 17 illustrates one example of the processing module and process mapping table to which the enabled flag column was added. To this processing module and process mapping table 63, the enabled flag column is added to indicate whether each processing module is able to carry out processing. The enabled flag column indicates that, for example, a processing module 1 (21-$a$) is enabled, while a processing module 1 (21-$b$) is disabled.

Figure 18:
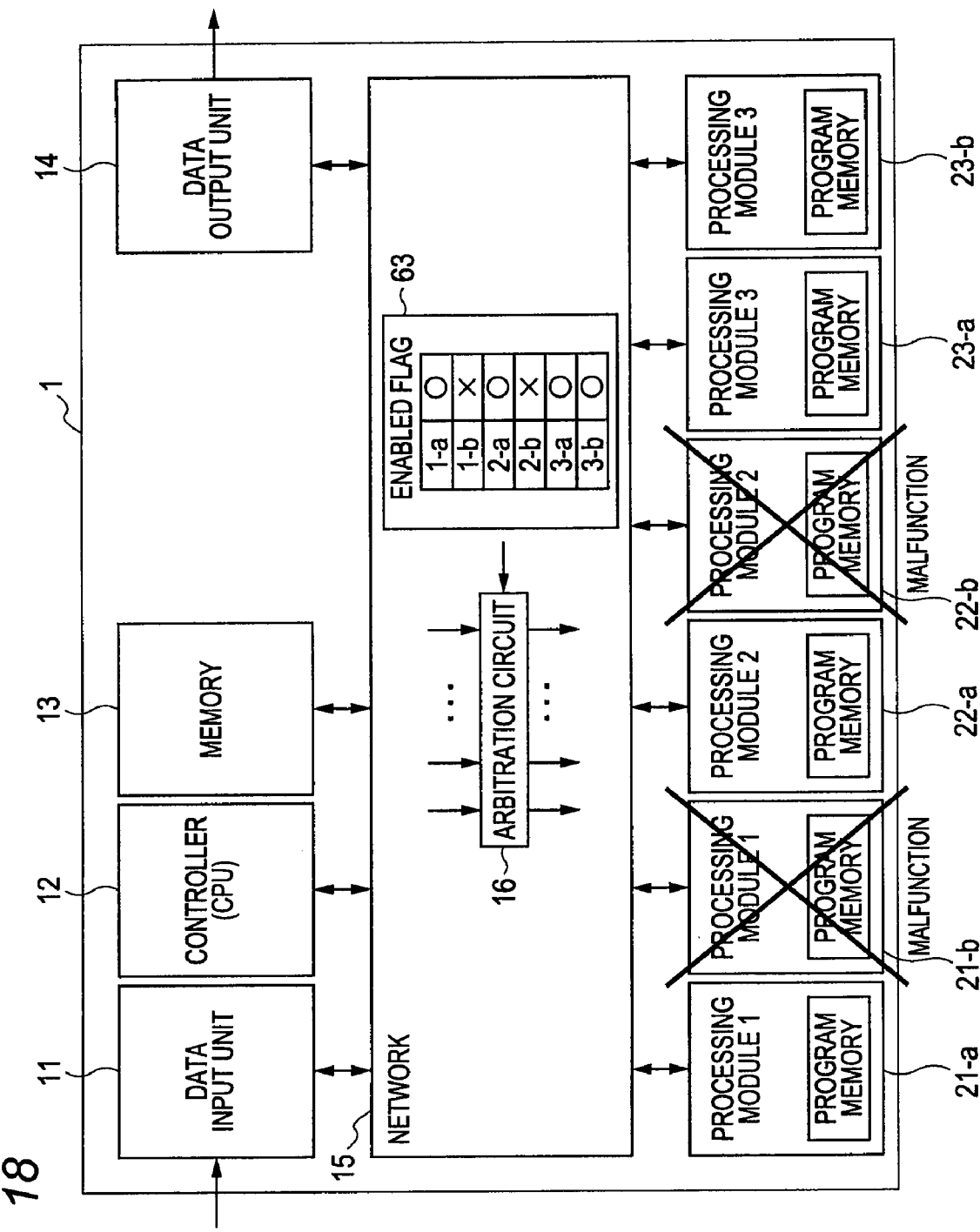
FIG. 18 is a block diagram showing an example of structure of the data processing device provided with an additional function of malfunction avoidance.

FIG. 18 is a block diagram showing an example of structure of the data processing device provided with an additional function of malfunction avoidance. The controller 12 executes a malfunction diagnosis program for each processing module and determines whether the diagnosed module malfunctions. The arbitration circuit 16 receives a result of the diagnosis from the controller 12 and adds it as an enabled flag to the processing module and process mapping table 63.

When performing an arbitration between or among packets, the arbitration circuit 16 refers to the enabled flag column and assigns no process to a processing module for which the enabled flag is "disabled". That is, by reassigning a process already assigned to the malfunctioned processing module to another processing module, malfunction avoidance as the system is realized.

FIG. 18 indicates that a processing module 1 (21-$b$) and a processing module 2 (22-$b$) are diagnosed as malfunctioning and no process is assigned to these two processing modules.

As described above, according to the data processing device in the present embodiment, malfunction diagnosis is periodically performed and a mechanism is provided so that no process is assigned to malfunctioned modules. Thus, autonomous malfunction avoidance can be realized and the system reliability can be improved.

Fifth Embodiment

A data processing device in a fifth embodiment of the present invention is characterized in that each processing module compresses data when storing the data in a packet and a processing module having received the packet decompresses the data.

In the processing module illustrated in FIG. 4, the input/output control unit 31 within the processing module compresses data by a predetermined method, stores the data in a packet, and outputs the packet to the network 15. On the other hand, upon receiving a packet from the network 15, the input/output control unit 31 decompresses the data contained in the packet by a predetermined method.

Compression/decompression methods classified by data category or type such as, e.g., moving image, static image, and voice, are used. The input/output control unit 31 monitors data to be transferred and compresses the data by a method that yields a high compression ratio according to the properties of the data. This compression/decompression processing may be implemented by either hardware or software.

Compression of data that is stored in a packet, incorporated as described above, decreases data amount to be transported by the bus and allows for wider bandwidth of the bus and low power consumption.

The embodiments disclosed herein are to be considered in all respects as illustrative and not restrictive. The scope of the present invention is indicated by the appended claims, rather than by the foregoing description, and all changes which come within the meaning and range of equivalency of the claims are therefore intended to be embraced therein.

What is claimed is:

1. A data processing device comprising a plurality of processing modules coupled by a network,
wherein processes following a processing flow are assigned to the processing modules respectively,
wherein at least two of the processing modules are capable of running a same process, and
wherein the network includes an arbitration means that, upon receiving a packet from a first processing module, according to a process number attached to the packet, selects a second processing module out of the processing modules capable of running the process and outputs the packet to the second processing module.

2. The data processing device according to claim 1, wherein the second processing module, upon receiving the packet from the arbitration means, carries out processing corresponding to the process number, stores resulting data from the processing and a next process number in the packet, and outputs the packet to the network.

3. The data processing device according to claim 1 or 2, further comprising a data input means that creates the packet by assembling data which has been input from outside in a unit of processing, attaches a serial number and the process number to the packet, and outputs the packet to the network.

4. The data processing device according to claim 3, wherein the arbitration means determines priority between or among packets to be output, based on the serial number attached to the packet, and performs a bus arbitration.

5. The data processing device according to claim 1, wherein the arbitration means has a processing module and process mapping table associating a processing module with a process which can be run by the processing module and determines a processing module to which the packet is to be output, based on a process number attached to the packet and the mapping table.

6. The data processing device according to claim 1, wherein the second processing module includes, as bank memories, a first memory which is used when carrying out operational processing and a second memory which is used to buffer a packet which is input from and output to the network, and performs the operational processing and the packet input/output processing in parallel.

7. The data processing device according to claim 1, further comprising a power supply control means that controls the power supply of each of the processing modules,
wherein, when a processing module is going to start processing, the arbitration means controls the power supply control means to turn on the power supply of the processing module, and once a processing module has completed processing, the arbitration means controls the power supply control means to turn off the power supply of the processing module.

8. The data processing device according to claim 7, wherein a memory for storing a program to be run by the processing module is made of a nonvolatile memory.

9. The data processing device according to claim 1, further comprising a malfunction diagnosis means that performs malfunction diagnosis of the processing modules,
wherein the arbitration means selects a processing module to which the packet is to be output, while passing over a processing module or modules diagnosed as malfunctioning by the malfunction diagnosis means.

10. The data processing device according to claim 1, wherein at least one of the processing modules includes a compressing means that compresses and stores resulting data from processing in the packet.

* * * * *